United States Patent [19]

Fitzpatrick

[11] Patent Number: 5,039,035
[45] Date of Patent: Aug. 13, 1991

[54] HELMET ASSEMBLY WITH INFLATABLE ACTUATORS

[75] Inventor: Roger S. Fitzpatrick, Cheltenham, England

[73] Assignee: Smiths Industries Public Limited Company, London, England

[21] Appl. No.: 512,107

[22] Filed: Apr. 20, 1990

[30] Foreign Application Priority Data

May 3, 1989 [GB] United Kingdom ............... 8910082

[51] Int. Cl.$^5$ ............................................. B64D 11/06
[52] U.S. Cl. ........................... 244/122 O; 244/118.5;
  244/121; 128/857; 002/006; 280/728
[58] Field of Search ...... 244/122 AG, 118.5, 122 AE,
  244/121; 2/6; 128/857, DIG. 20; 280/728, 743,
  748, 751

[56] References Cited

U.S. PATENT DOCUMENTS

| 3,645,259 | 2/1972 | Schalman | 244/122 AG |
|---|---|---|---|
| 3,765,412 | 10/1973 | Ommaya et al. | 128/857 |
| 3,840,088 | 10/1974 | Marumo et al. | 280/748 |
| 4,243,024 | 1/1981 | Crosbie et al. | 244/122 AG |
| 4,664,341 | 5/1987 | Cummings | 128/857 |
| 4,899,961 | 2/1990 | Herndon | 244/122 AG |
| 4,909,459 | 11/1988 | Patterson | 244/122 AG |
| 4,967,985 | 11/1990 | Deakin | 244/122 AG |

FOREIGN PATENT DOCUMENTS

| 1503483 | 3/1978 | United Kingdom | 244/122 AG |
|---|---|---|---|
| 1524022 | 9/1978 | United Kingdom | 244/122 AG |

*Primary Examiner*—Joseph F. Peters, Jr.
*Assistant Examiner*—Christopher P. Ellis
*Attorney, Agent, or Firm*—Pollock, Vande Sande & Priddy

[57] ABSTRACT

A helmet for aircrew in a highly manueverable aircraft has six air bags which are inflated or deflated by a control system so as to counteract acceleration forces on the wearer's head and helmet. Two pairs of air bags engage the wearer's body, and two bags engage the seat headrest so that restoring forces in yaw, pitch and lateral directions can be applied. A position sensor determines the actual position of the helmet which is compared with the predicted position, as derived from an inertial sensor or inputs from the aircraft flight control system, the difference between these two positions being used to control operation of the air bags. A memory module programmed with information about the behavior of the wearer's head and helmet characterizes the control system to the particular wearer and is removable for use in other systems.

7 Claims, 5 Drawing Sheets

HELMET ASSEMBLY WITH INFLATABLE ACTUATORS

BACKGROUND OF THE INVENTION

This invention relates to helmet assemblies.

The invention is more particularly concerned with helmet assemblies worn by pilots and other crew members on board highly maneuverable aircraft.

It is known for pilots and other aircrew to experience discomfort and performance degradation under accelerative loads during violent aircraft maneuvers. In particular, in military aircraft, the effort of maintaining head-high lookout positions is known to be tiring. Additional masses worn on the head, such as helmets and sighting devices, exacerbate these problems; connectors, such as cables necessary to operate the devices, increase the resistance to motion of such helmets.

BRIEF DESCRIPTION OF THE INVENTION

It is an object of the present invention to alleviate most of the muscle effort an aircrewman need expend in moving his head, helmet and its attached devices, or in maintaining his head in its desired position during accelerated flight. The crewman may then be enabled to tolerate either greater g loads or more extended period of g exposure or to carry more cumbersome equipment on his helmet with lessened performance degradation.

According to the present invention there is provided a helmet assembly comprising a helmet and at least one actuator arranged to apply force to the head of the wearer in such a way as to counteract external forces on the head and helmet.

The assembly preferably includes a plurality of actuators which may be arranged to apply restoring forces in the yaw, pitch and lateral directions. The assembly may include a first pair of actuators located on one side of the helmet, one actuator of the first pair being located in front of the other, a second pair of actuators located on the opposite side of the helmet, one actuator of the second pair being located in front of the other, and a third pair of actuators located on the rear of the helmet, one actuator of the third pair being located to one side of the other. At least one of the actuators preferably contacts the body of the wearer and at least one of the actuators may contact a headrest of a seat on which the wearer is seated. The or each actuator which contacts the headrest preferably has a smooth plate attached to it which slides readily over the surface of the headrest. The or each actuator preferably includes a an inflatable air bag which may be of bellows shape. The or each air bag may be coupled to a respective pipe that extends to a source of pressurized gas, the or each pipe having a connector by which the helmet assembly can be disconnected from the source of pressurized gas. The or each pipe may have a manually-operable valve by which air in the or each air bag can be vented.

The or each actuator may be mounted on a frame secured to the helmet or be carried by the wearer and having an upper end that engages a lower edge of the helmet.

The assembly preferably includes a position sensor responsive to the position of the helmet, the or each actuator being controlled in response to the output of the position sensor. The assembly may include an inertial sensor responsive to acceleration, the or each actuator being controlled in response to the output of the inertial sensor. The assembly may include an actuator control system arranged to control operation of the or each actuator in accordance with the difference between the measured position of the helmet and a predicted position of the helmet derived from the output of the inertial sensor. The actuator control system ma be arranged to receive an input from an aircraft flight control system indicative of a commanded maneuver of the aircraft, the actuator system control being arranged to control operation of the or each actuator in accordance with the difference between the measured position of the helmet and a predicted position of the helmet derived from the input from the flight control system.

The actuator control system may have a computer and a removable memory module, the memory module being programmed with information about the behavior of the wearer's head and helmet so that operation of the control system is characterized to the particular wearer.

Three alternative helmet assemblies in accordance with the present invention, will now be described, by way of example, with reference to the accompanying drawings.

DETAILED DESCRIPTION OF THE PREFERRED EMBODIMENTS

Figure 1:
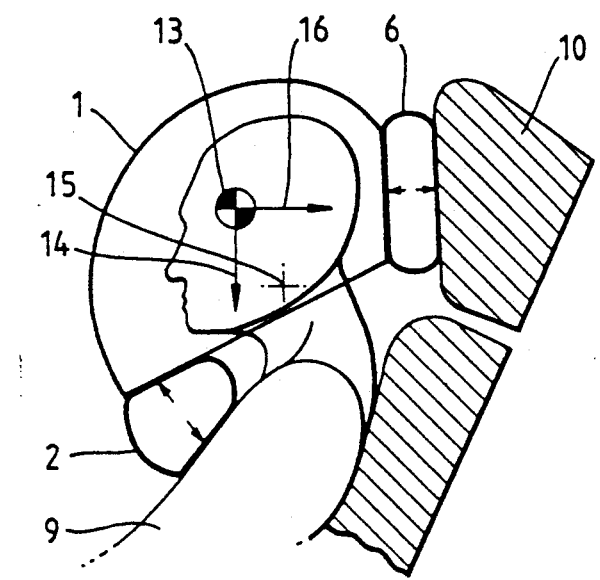
FIG. 1 is a diagrammatic side elevation view of a pilot's head and helmet showing actuators functioning about the pitch axis of the pilot's head.

With reference to FIGS. 1 to 5, the helmet assembly includes a conventional helmet 1 and six actuators, in the form of separate air bags 2 to 7 mounted on a support frame 8 secured to the helmet. The air bags are located on the frame 8 such that, when inflated, they contact the upper part of the pilot/aircrew's body 9 or the seat headrest 10. The air bags 2 to 7 are individually inflated or deflated by air from the aircraft's pneumatic supply 11 under control of a control system 12, so as to increase or reduce the force between the helmet and the crew's body 9 or headrest 10.

In FIG. 1, the air bags 2 and 6 are shown partially inflated, such that any acceleration of the pilot upwards tending to rotate the center of gravity 13 of his head-helmet combination downwards in pitch by inertial force 14 about its natural point of rotation 15 at the base of the skull, is resisted by pressure in the air bag 2 reacting against the pilot's helmet 1 above and the pilot's body 9 below. Forward components of acceleration, tending to pitch the pilot's head backwards by inertial force 16, are resisted by pressure in the air bag 6 attached to the rear of the helmet 1 reacting against the pilot's seat headrest 10. By varying the quantity of air in the bags 2 and 6, the stable position of the pilot's head under varying levels of acceleration can be controlled without muscular effort by the pilot. The forces applied, in this way, to the pilot's head via his helmet 1 are predominantly linear, the direction of action of the forces being tangential to the point of rotation 15. The actuators are arranged to apply forces in orthogonal axes so that the helmet can be turned and translated to any desired position or orientation.

Figure 2:
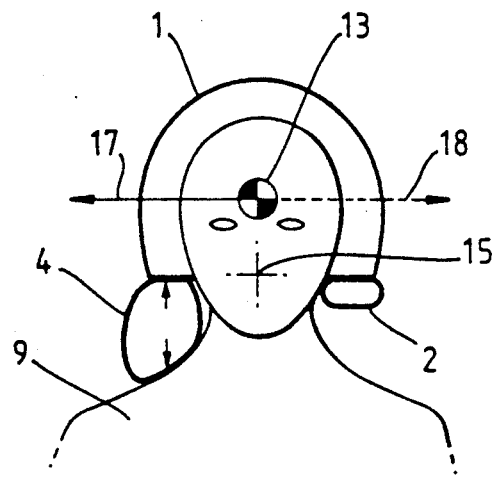
FIG. 2 is a diagrammatic front view of a pilot's head and helmet showing actuators functioning about the roll axis.

FIG. 2 shows, in front elevation, inflation of the air bag 4 which reacts against the pilot's body 9 to stabilize the helmet 1 against a lateral, acceleration-induced inertial force 17 tending to roll the pilot's head sideways about the neck rotation point 15. The air bag 2 on the up-going side of the helmet 1 is shown deflated but can be rapidly inflated in the event the sense of application of inertial force 17 is reversed, shown dotted by numeral 18, tending to roll the pilot's head in the opposite direction.

Figure 3:
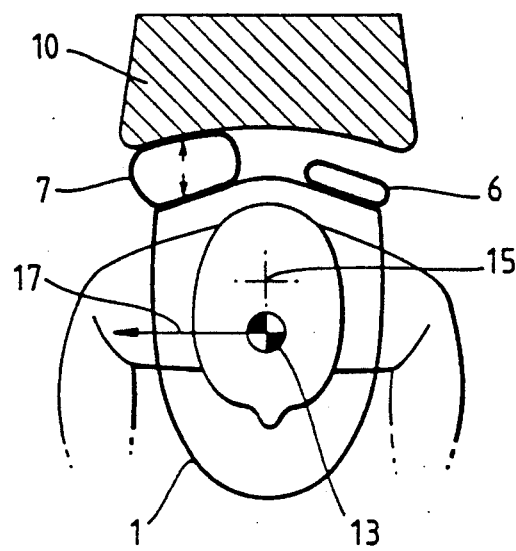
FIG. 3 is a diagrammatic plan view of a pilot's head and helmet showing actuators functioning about the yaw axis.

FIG. 3 shows, in plan view, inflation of the air bag 7 attached to the rear of the pilot's helmet 1. This reacts against the headrest 10 to resist a lateral acceleration-induced inertial force 17 tending to yaw the center of gravity 13 of the pilot's head-helmet combination sideways about the neck rotation point 15. The air bag 6 is shown deflated but may be rapidly inflated to stabilize the position of the pilot's head should inertial force 17 reverse its direction of application.

It will be appreciated that any combination of the actuator air bags shown in FIGS. 1, 2 and 3 may be inflated to position the pilot's head-helmet in other positions not shown.

Figure 4:
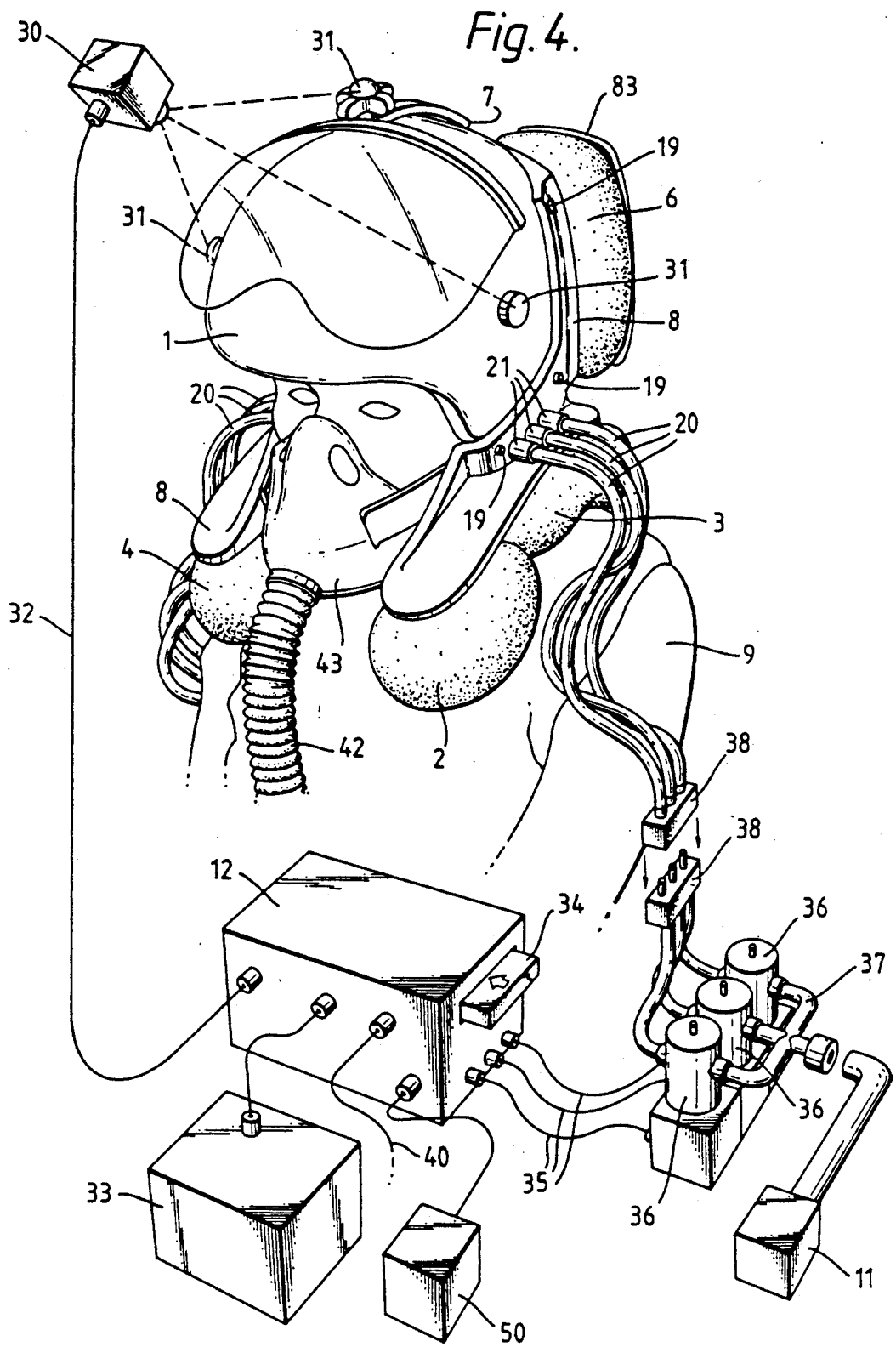
FIG. 4 is a perspective view of the components of the invention arranged as an attachment to a standard pilot's helmet.
Figure 5:
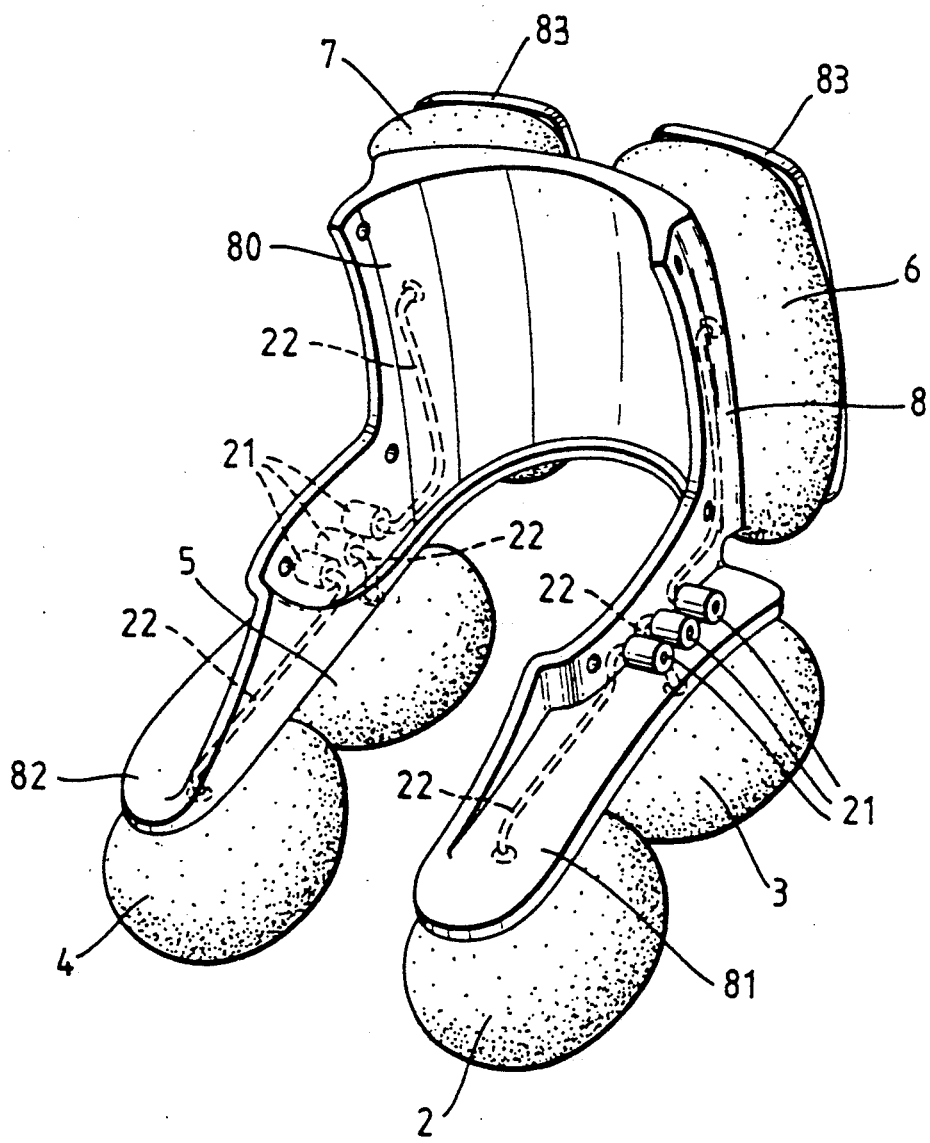
FIG. 5 is a perspective view of a part of the helmet assembly shown in FIG. 4.

With reference now more especially to FIGS. 4 and 5, the support frame 8 is attached to the pilot's helmet 1 by fasteners 19. The frame 8 is symmetrical, having a concave vertical back-plane 80 which engages the rear of the helmet 1, and two shoulder plates 81 and 82 which extend forwardly, in a generally horizontal plane, on opposite sides of the helmet. On the under side of the left-hand plate 81 are supported the two air bags 2 and 3. The forward bag 2 is located to engage the upper chest of the crew; the rear bag 3 engages the shoulder of the crew. Similarly, the air bags 4 and 5 are supported under the right-hand plate 82. The back-plane 80 supports the two air bags 6 and 7 which are mounted side-by-side on the left and right side of the back-plane respectively. The air bags 2 to 7 are readily removable from the frame 8 for repair and maintenance. The rear air bags 6 and 7 both have, on their surface, a smooth plate 83 which enables the pilot to turn his head with minimum friction when in contact with the seat headrest 10. The size of the air bags is selected such as to limit the extent of displacement of the pilot's head to an amount that will not cause injury.

Compressed air is supplied to the assembly via six flexible pipes 20 which are coupled with respective ports 21 on the frame 8. The ports 21 connect with individual ones of the air bags 2 to 7 via pipes 22 that extend within the frame 8.

A helmet position sensor 30, which may employ electro-magnetic, electro-optic, ultrasonic or other means of detection, senses the position of markers 31 attached to the pilot's helmet 1 and, by calculation, locates the helmet in space. This location information is passed via a cable 32 to the control system 12 which includes an electronic computer. Detected movements of the helmet 1 are compared with movements predicted by calculation with reference to the inertial forces detected by an inertial measurement sensor 33 attached to the aircraft. The fidelity with which the inertial responses of the pilot's head-helmet combination are predicted may be enhanced by reference to previously recorded computerized information peculiar to the pilot and which he provides to the control system 12 by inserting a memory module 34 when boarding the aircraft.

The control system 12 may include a neural net computer which monitors over time the measured effects of actuator commands. In this way, a model of the behavior of the helmet assembly on the particular pilot is continually built up so that progressively more appropriate actuator operations are commanded. This information may be recorded in the memory module 34 and take the form of a profile of the synaptic strengths of the computer memory. Initially, the control system would include a set of standard starting instructions which is modified as better knowledge of the variables, such as the mass of the pilot's head, is acquired during the flight. Any differences between the measured and predicted movements of the helmet 1 are interpreted by the control system 12 to be head positioning commands imparted by the pilot exerting muscular effort. Electrical signals are supplied via cables 35 to electrically-actuated servo-pneumatic valves 36. The valves 36 are arranged one per air bag and admit pressurized air from the aircraft supply 11 via a manifold 37 into the pipes 20 and thence into selected air bags 2 to 7, so as to drive the helmet 1 to the calculated commanded position. The valves 36 may similarly be signalled to vent designated air bags so that they collapse under incident forces, or may open them to a suction source (not shown) for more rapid collapse.

The control system 12 may be commanded not to actuate pressurization of the air bags until a pre-set threshold acceleration level is encountered by the pilot.

By a further input from the aircraft's flight control system 50, the helmet control system 12 may be provided with information on forthcoming aircraft maneuvers, thus permitting anticipatory actuation of the air bags 2 to 7 before the development of measurable changes in ambient acceleration.

The pipes 20 are separated for pilot ingress or egress from the aircraft at a personal equipment connector 38 which preferably incorporates in one connector, all pipes for the helmet assembly and other pilot system connections (not shown).

The helmet assembly alleviates the need for the pilot to exert muscular energy to prevent his head from being deflected from position by accelerative forces. This enables the pilot to view his instrumentation and the external scenery with less difficulty and reduces tiredness and the risk of injury. The pilot is also, however, free to move his head at will.

When not required, the actuators may be retracted to reduce obstruction to the pilot's movement, such as applying suction.

The control system 12 may receive a loss-of-consciousness monitoring input 40 and be arranged, on receipt of such a signal, to drive the actuators so that the pilot's head is moved to a position in which he will be least prone to injury and most likely to recover quickly. Similarly, in the event of ejection, appropriate ones of the actuators may be extended to stabilize the pilot's head position and neck flexure to prevent spinal compression and other injuries. By appropriately shaping the actuators they can minimize airblast effects. Actuation on ejection may be by stored energy within the seat and may be commanded by the seat sequencer independently of the control system 12. The sequencer may similarly command disablement of the actuators after separation from the aircraft. Alternatively, the actuators may remain extended, subject to manual selection, to assist injury-free parachute descent of an unconscious pilot and correct head positioning in the event of landing in water.

Figure 6:
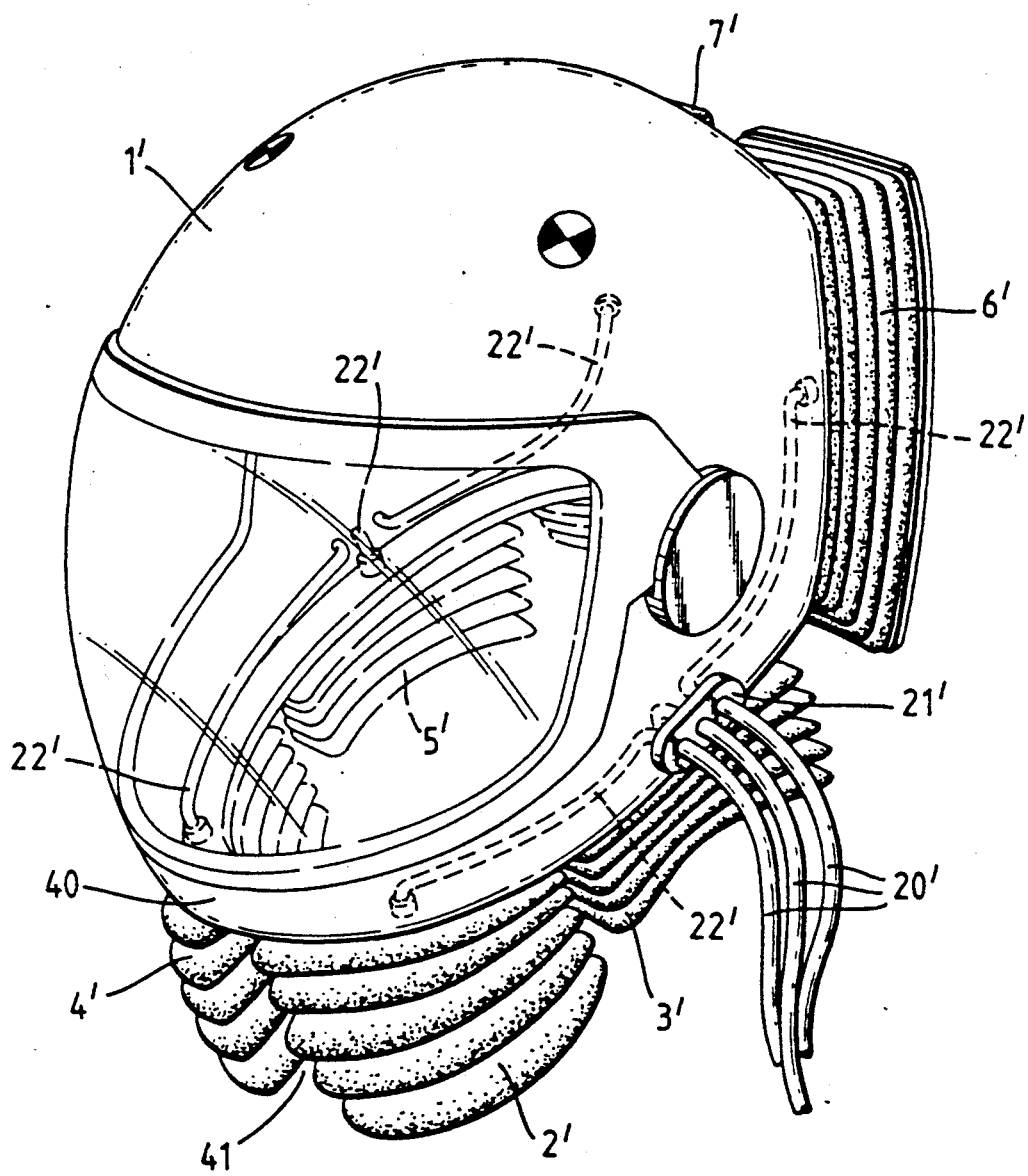
FIG. 6 is a perspective view of an alternative helmet assembly.

An alternative helmet assembly is shown in FIG. 6 in which the helmet 1' is especially shaped to accommodate the invention by the incorporation of a chin frame 40 which is integral with the shell of the helmet. The frame 40 has attached at its bottom edge, air bags 2' and 4', under the pilot's chin, and air bags 3' and 5', under his ears. The air bags 2' and 4' are separated by a gap 41 through which may pass an oxygen pipe 42 to the pilot's face mask 43 (shown in FIG. 4).

Compressed air is supplied via pipes 20' to ports 21' (duplicated on the other side of the helmet, not shown) and thence through pipes 22' within the shell of the helmet 1' to the airbags 2' to 7'.

Figure 7:
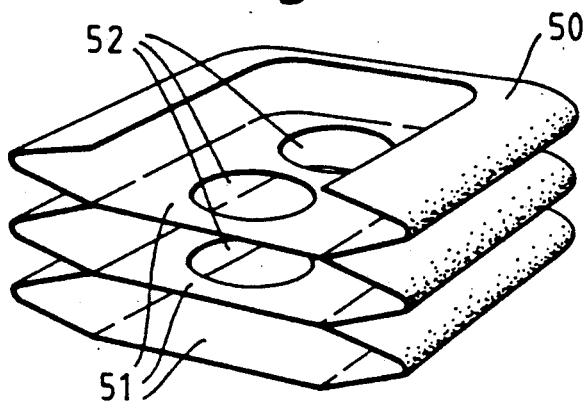
FIG. 7 is a perspective view partly cutaway of actuator bellows shown in FIG. 6.

FIG. 7 shows a cutaway view of an alternative form of air bag used in the assembly shown in FIG. 6. The air bag has an envelope 50 in the shape of a bellows of rubber-impregnated flexible-matrix material. Air injected into the bellows, or extracted from it, will tend to expand or contract it in a direction perpendicular to its edge corrugations, while lateral changes of shape will be resisted by internal diaphragms 51 incorporating breather holes 52 to permit the free passage of gases.

Figure 8:
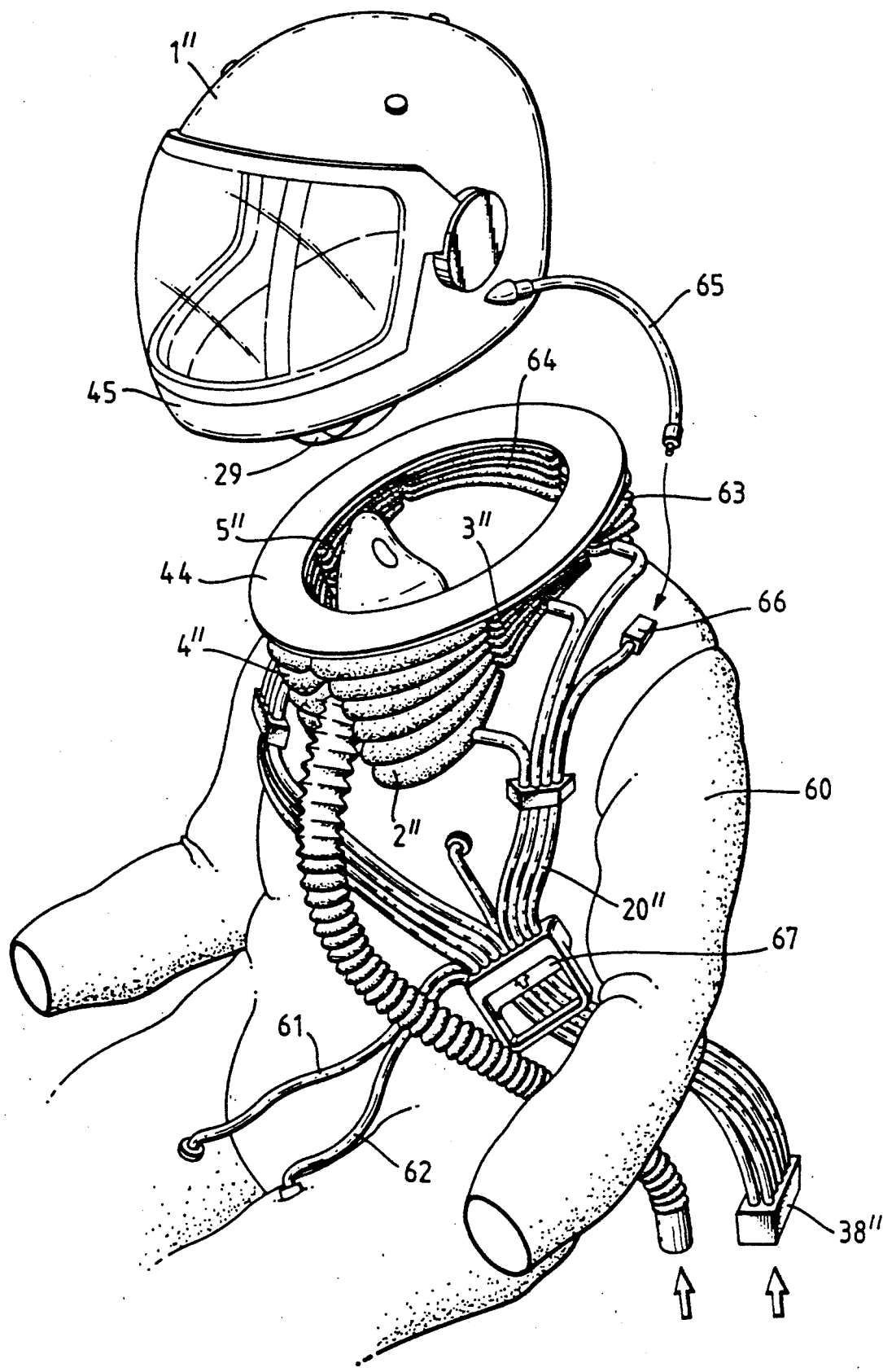
FIG. 8 is a perspective view of a further helmet assembly.

FIG. 8 shows a further alternative embodiment of the invention in which actuators 2" to 5" are worn by the pilot (not shown) independently of his helmet 1". The actuators are attached to the pilot's jacket 60 or may be worn as a component of a smaller garment.

Additional air bag actuators 63 and 64 may be used in this assembly, being located behind the pilot's neck. The helmet 1" is attached to the pilot's head by a chin strap 29 so that the helmet moves with the head.

The tops of the actuators 2" to 5", 63 and 64, adjacent to the helmet, are attached to a smooth-faced plate 44 which may be segmented or may form a continuous ring, as shown. In this way, the lower surface 45 of helmet 1" may slip with minimum friction on the plate 44 when the pilot turns his head in the yaw sense.

The plate 44 is preferably not attached to the helmet 1". Alternatively, the plate 44 may be constrained axially with respect to the helmet 1" after donning by the pilot, while still being free to rotate circumferentially, thus forming the neck-seal of what may be a pressure suit.

Pipes 20" conducting compressed air from the personal equipment connector 38" to the air bag actuators are preferably attached to the jacket 60 to minimize cockpit clutter. The source of compressed air may be the same as that used to inflate the pilot's g-suit via pipes 61 and 62.

Where headrest air bags (not shown) are attached to the helmet 1", connector pipes 65 may be plugged into the air supply 20" in the jacket via a socket 66.

A lever 67 coupled with a valve is connected in line with the pipes 20" so that, by manually depressing the lever 67, the valve is opened and the pilot may vent and deflate the air bags at any time.

The invention is not restricted to the use of airbags or other pneumatic actuators. Alternatively, hydraulic, mechanical or electromechanical actuators could be used. Any number of actuators could be used for greater dexterity of operation, more rapid actuation, redundancy of operation or for other purposes. The helmet assembly could include force sensors that detect the pressure exerted on the pilot's head by the helmet. This is sensed and used to control the actuators in a sense that reduces this pressure. The actuators need not apply force to the pilot's head via the helmet but could do this directly by contact with the head, such as by means of an actuator under the chin.

What I claim is:

1. A helmet assembly comprising a helmet, a first pair of inflatable actuators located on one side of the helmet, one actuator of the first pair being located in front of the other, a second pair of inflatable actuators located on the opposite side of the helmet, one actuator of the second pair being located in front of the other, a third pair of inflatable actuators located on the rear of the helmet, one actuator of the third pair being located to one side of the other, a source of pressurized gas, valve means connected between said source and said actuators, and control means connected with said valve means such that a restoring force in yaw, pitch and lateral directions can be applied to the helmet under control of said control means by inflation of appropriate ones of said actuators.

2. A helmet assembly according to claim 1 wherein a wearer of the helmet is seated on a seat having a headrest, wherein the first and second pairs of actuators contact the body of the wearer, and wherein the third pair of actuators contact the headrest of the seat.

3. A helmet assembly according to claim 1, wherein the assembly includes a position sensor responsive to the position of the helmet, and means for supplying an output of the position sensor to said control means such that said actuators are controlled in response to the output of the position sensor.

4. A helmet assembly according to claim 1, wherein the assembly includes an inertial sensor responsive to acceleration, and means for supplying an output of the inertial sensor to said control means for controlling the or each actuator such that said actuators are controlled in response to the output of the inertial sensor.

5. A helmet assembly according to claim 1, wherein the assembly includes a position sensor responsive to the position of the helmet, an inertial sensor responsive too acceleration, mans supplying an output of the position sensor and an output of the inertial sensor to said control means, said control means being operative to derive an indication of the predicted position of the helmet from the output of the inertial sensor and being operative to derive an indication of the actual position of the helmet from the output of the position sensor, said control means including means for deriving an indication of the difference between the actual position of the helmet and the predicted position, and the control means being operative too control the inflation of said actuators in accordance with said difference such as to resist displacement of the helmet by acceleration forces.

6. A helmet assembly according to claim 1, wherein the assembly include a position sensor responsive to the position of the helmet, an aircraft flight control system operative to produce an output indicative of a commanded maneuver of the aircraft, means supplying an output of the position sensor and said output of the flight control system to said control means said control means being operative to derive an indication of the predicted position of the helmet from said output of the flight control system, said control means also being operative to derive an indication of the actual position of the helmet from said output of the position sensor, and means for deriving an indication of the difference between the actual position of the helmet and the predicted position, said control means being operative to control the inflation of said actuators in accordance with said difference such as to resist displacement of the helmet tending to be caused by said commanded maneuver.

7. A helmet assembly according to claim 1, wherein said control means includes a computer and a removable memory module, said memory module being programmed with information about the behavior of the head and helmet of a wearer of said helmet so that operation of said control means is characterized to the particular wearer.

* * * * *